United States Patent

[11] 3,621,865

| [72] | Inventor | Thomas Henry Baggaley<br>34 Rothschild Street, London, S.E. 27, England |
|---|---|---|
| [21] | Appl. No. | 886,882 |
| [22] | Filed | Dec. 22, 1969 |
| [45] | Patented | Nov. 23, 1971 |
| [32] | Priority | Jan. 6, 1969 |
| [33] | | Great Britain |
| [31] | | 805/69 |

[54] FLUID PRESSURE-OPERATED PUMPS
6 Claims, 6 Drawing Figs.

[52] U.S. Cl. .................................................. 137/98, 417/372, 417/401
[51] Int. Cl. ........................................................ G05d 11/00
[50] Field of Search .......................................... 137/98, 99, .5; 222/335; 417/372, 401

[56] References Cited
UNITED STATES PATENTS

| 1,763,728 | 6/1930 | Turner | 137/98 |
|---|---|---|---|
| 1,931,818 | 10/1933 | Hartman | 137/99 |
| 1,999,881 | 4/1935 | Lowe | 137/99 |
| 2,218,393 | 10/1940 | Corydon | 137/99 |
| 2,287,760 | 6/1942 | Hicks | 417/401 |
| 2,610,643 | 9/1952 | Goff | 137/99 |
| 2,837,105 | 6/1958 | Henke | 137/99 |
| 2,889,084 | 6/1959 | Tour | 417/401 X |

*Primary Examiner*—Laverne D. Geiger
*Assistant Examiner*—David J. Zobkiw
*Attorney*—Holcombe, Wetherill & Brisebois ABSTRACT: Apparatus for supplying metered quantities of an additived water flowing under pressure through a pipe comprises a pump which is operated by water from the pipe and includes to coaxial cylinders of different diameters. The cylinders have pistons which are connected to each other and together form a plunger which is spring loaded in one direction. The cylinder of smaller diameter forms a pump chamber for the liquid additive and the cylinder of larger diameter forms an operating chamber to which the water for operating the pump is admitted under the control of a valve which is itself controlled by a flowmeter in the pipe to allow a pulse of water under pressure from the pipe to act on the larger piston to cause the plunger to make a delivery stroke and then to vent the water to allow the plunger to make a return stroke under the action of its spring, the frequency of the pulses and hence the pump output being dependent on the crate of flow of the water through the meter so that a constant proportion of the liquid additive is supplied to the water flowing through the pipe.

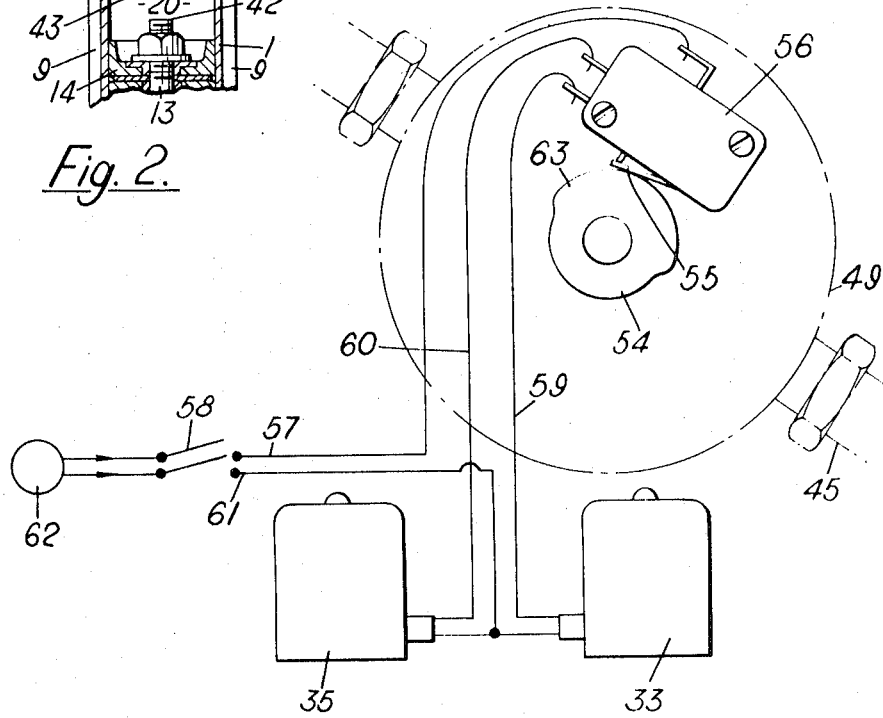

in projections from the block 5 and nuts 10 are screwed onto
FLUID PRESSURE-OPERATED PUMPS This invention relates to apparatus for supplying liquid additives to water flowing under pressure through a pipe.

One form of apparatus for this purpose is described in my British Pat. No. 1,117,516 and this comprises a pump which is operated by fluid under pressure and includes a pumping chamber for the liquid additive bounded in part by one face of a movable pumping member, in the form of a resilient diaphragm, which is acted upon on its face remote from the pumping chamber by the operating fluid under the control of the valve. The valve is controlled by a flowmeter in the pipe to allow a pulse of fluid under pressure to act on the diaphragm to cause the diaphragm to make a delivery stroke and then to vent the fluid to allow the diaphragm to make a return stroke. The frequency of the pulses and hence the pump output is dependent on the rate of flow of the water through the meter so that a constant proportion of the liquid additive is supplied to the water.

Since in this pump the pumping member is in the form of a diaphragm, it has the same effective area over both its faces so that the operating fluid acts over the same area as that which is applied in the pumping chamber to the liquid additive being pumped. It is therefore essential that the pressure of the operating fluid should be greater than that of the pressure against which the liquid is pumped because the pressure of the operating fluid must produce a force which is sufficient to overcome the back pressure of the liquid and also to overcome the elasticity of the diaphragm to enable it to deflect the diaphragm and bring about a pumping stroke.

The operating fluid used with this prior apparatus is generally air, but this limits the apparatus to use in a place, such as a factory, where there is a supply of air under a sufficiently high pressure.

On farms and in greenhouses there is no such supply of air under pressure available and the apparatus described in my prior specification is not therefore suitable for supplying liquid additives, such as liquid fertilizer or weedkiller, to irrigation water for agricultural or horticultural purposes. The present invention arises from the problem of supplying liquid additives to water flowing under pressure through a pipe for agricultural or horticultural purposes where the only source of power for operating the pump lies in the supply of water in the pipe itself.

To solve this problem, according to the present invention, apparatus of the kind described above is characterized in that the pumping member, instead of being a diaphragm, is a spring-loaded plunger comprising a pair of interconnected pistons, the piston of smaller diameter having its end face bounding the pumping chamber and the end face of the larger piston bounding a chamber which is connected to the pipe through which the water under pressure flows so that a part of the water flowing through the pipe under pressure forms the operating fluid and the liquid additive is pumped into the water using the pressure of the water itself.

It will be seen that because the part of the water under pressure which acts as the operating fluid acts over a larger area than that on which the liquid being pumped acts, an out-of-balance force is produced by the water forming the operating fluid and this out-of-balance force is sufficient to overcome the force of the spring of the spring-loaded plunger and also to overcome any friction of the two pistons in their cylinders.

Preferably the two pistons forming the plunger are interconnected by a piston rod which passes through an opening in a partition separating two cylinders in which the two pistons move. The cylinder of smaller diameter forms the pumping chamber and the cylinder of greater diameter forms, on one side of the larger piston, the chamber which is connected to the pipe through which the water flows. On the other side of the larger piston, the cylinder of greater diameter contains a coiled compression spring which acts between the partition and the piston of greater diameter to provide the spring loading.

Preferably a removable or adjustable stop is provided in the cylinder of smaller diameter to enable the stroke of the plunger to be varied. This enables the proportion of liquid additive supplied to the water flowing through the pipe to be adjusted.

An example of apparatus constructed in accordance with the invention is illustrated in the accompanying drawings in which:

FIG. 2 is a section through the pumping chamber similar to a part of FIG. 1, but showing a modification;

FIG. 4 is an electrical circuit diagram showing the circuit of two solenoid valves forming part of the pump and showing also in outline a rotary flowmeter forming part of the apparatus and including a cam; and, FIGS. 5a and 5b show alternative cams which can be substituted for the cam shown in FIG. 4.

Figure 1:
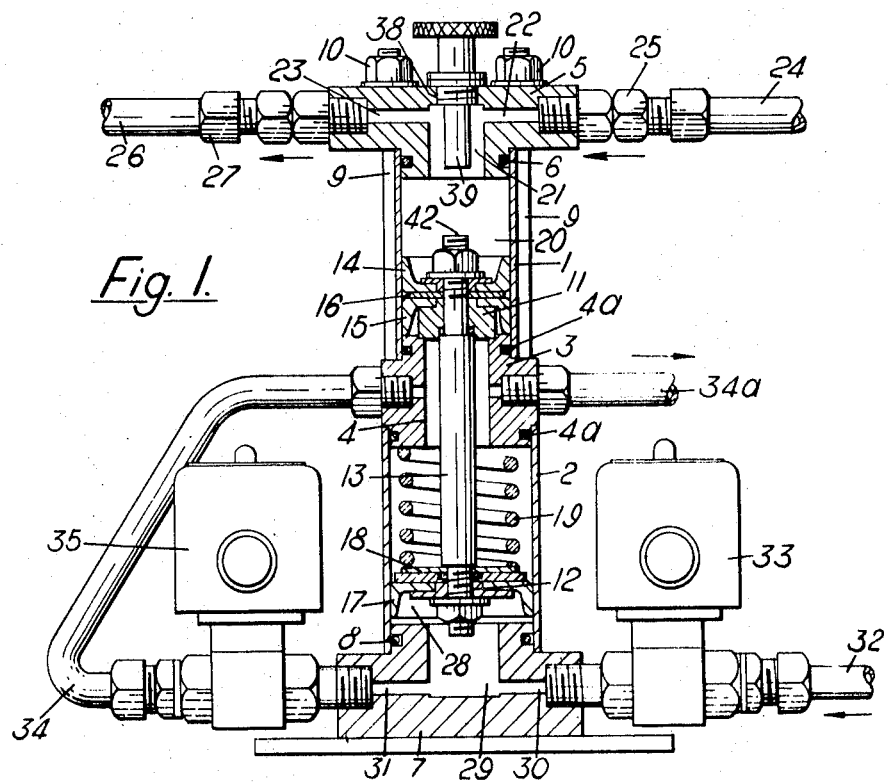
FIG. 1 is a section through the pumping chamber and the adjacent parts of the pump.

As shown in FIG. 1, the pump comprises an upper cylinder 1 of smaller diameter and a lower cylinder 2 of larger diameter. There is a partition 3 between the cylinders 1 and 2 and this partition has an opening 4 through it and is sealed to the cylinders 1 and 2 by sealing rings 4a. The upper end of the upper cylinder 1 is closed by a die-cast block 5 with a sealing ring 6 and the lower end of the lower cylinder 2 is closed by another block 7 with a sealing ring 8. The assembly formed by the cylinders 1 and 2, the partition 3 and the blocks 5 and 7 is held together by four clamping rods 9, two of which are shown in FIG. 1. The clamping rods 9 have their screw-threaded lower ends screwed into tapped holes in the block 7 and their upper ends, which are also screw threaded, pass through holes in projections from the block 5 and nuts 10 are screwed onto them. Tightening of the nuts 10 clamps the whole assembly together.

The cylinders 1 and 2 contain a plunger formed by pistons 11 and 12 interconnected by a piston rod 13. The piston 11 is double acting and has two oppositely facing cup washers 14 and 15 separated by a rigid metal washer 16. The piston 12 is only single acting and is formed by a single cup washer 17 with a backing-up washer 18.

A coiled compression spring 19 is located within the cylinder 2 and acts between the underside of the partition 3 and the upper surface of the backing-up washer 18. The spring 19 acts to bias the whole plunger assembly downwards into the piston shown in FIG. 1 in which the piston 11 abuts the upper face of the partition 3.

A space 20 within the cylinder 1 above the piston 11 forms a pumping chamber and communicates with a bore 21 in the block 5. The bore 21 is turn communicates with further bores 22 and 23 forming liquid inlet and outlet ducts respectively for the pump An inlet pipe 24 is connected to the duct 22 through an inlet nonreturn valve 25 and an outlet pipe 26 is similarly connected to the bore 23 through an outlet nonreturn valve 27.

A space 28 below the piston 12 within the cylinder 2 forms an operating fluid chamber and this communicates with a bore 29 in the block 7. The block 7 is also formed with an inlet duct 30 and an outlet duct 31 for the operating fluid. A supply pipe 32 for the operating fluid communicates with the duct 30 through a solenoid valve 33 and a drainpipe 34 for the operating fluid communicates with the duct 31 through a second solenoid valve 35. The drainpipe 34 communicates with the opening 4 in the partition 3 and hence with the spaces in the CYLINDERS 1 and 2 between the pistons 11 and 12, so that these spaces are always flushed with water.

The valves 33 and 35 are connected in a circuit with a changeover switch by which one valve is energized and the other deenergized and then this state of affairs is reversed so that any time the inlet valve is open an the outlet valve is closed or vice-versa.

When the valve 33 is energized, operating fluid under pressure is admitted to the space 28 so that the chamber 28 is filled with operating fluid under pressure and this pushes the plunger assembly upwards against the action of the spring 19. When this happens, the piston 11 makes a pumping stroke in which liquid displaced from the pumping chamber 20 passes out through the outlet nonreturn valve 27. Then when the valve 33 is deenergized and the valve 35 is energized, the plunger is returned to the position shown in FIG. 1 by the spring 19 and in so doing it causes the piston 17 to expel the operating fluid through the valve 35. As the double-acting piston 11 moves downwards under the action of the spring 19, further liquid is drawn into the chamber 20 through the inlet nonreturn valve 25.

The block 5 has a further bore 38 which is tapped and closed by a plug 39 which is provided with a knurled knob 40 to enable it to be screwed in and unscrewed manually. The upward stroke of the plunger is limited by the upper end 42 of the piston rod 13 coming into contact with the bottom of the plug 39. To reduce the stroke of the pump and so to reduce the volume of liquid pumped at each stroke, the plug 39 may be substituted by a plug 39a shown in FIG. 4 of the drawings. The plug 39a carries a pin 41 which extends downwards through the bore 21 into the chamber 20. With this in position, the stroke of the plunger is limited by the upper end 42 of the piston rod 13 coming into engagement with the tip 43 of the pin 41. The pump may be provided with a number of different plugs 39 provided with pins of different lengths to enable the stroke of the pump to be set as required. As an alternative to the different pins, which form removable stops, the plug 39 may be provided with an elongated threaded part which is screwed into the bore 38 and in this way the inner tip of the screw-threaded part forms a stop which is adjustable by screwing it further in or out as required.

Figure 3:
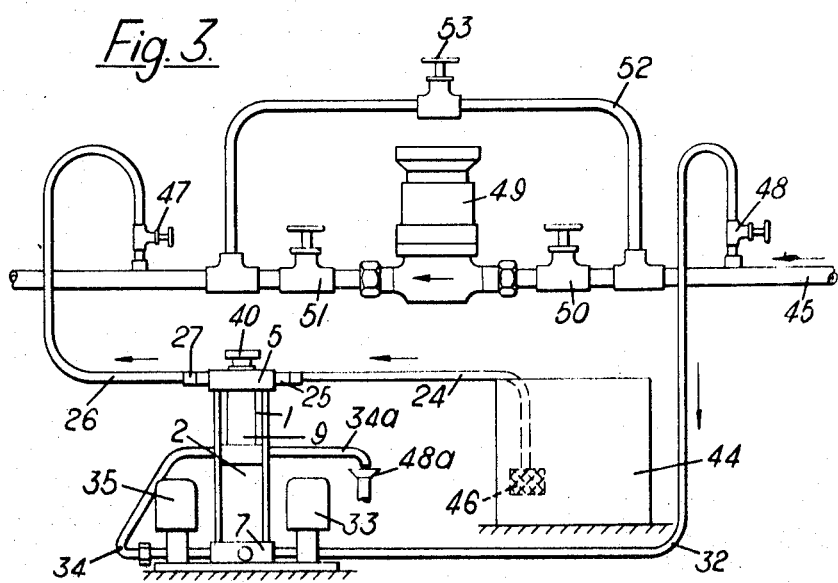
FIG. 3 is a side view of the apparatus as a whole to a smaller scale than FIGS. 1 and 2.

The liquid-proportionating apparatus as a whole shown in FIG. 3 is intended for supplying liquid fertilizer from a reservoir tank 44 to a stream of irrigating water which is supplied under pressure through a pipe 45. For this purpose the inlet pipe 24 of the pump extends into the tank 44 and is arranged to suck up liquid fertilizer contained in the tank 44 through a filter 46. The pump outlet pipe 26 is connected to the pipe 45 through a stop valve 47. The pipe 32 for supplying operating liquid to the pump is also connected to the pipe 45 and this connection is upstream of the connection of the pipe 26 and takes place through a further stop valve 48. A pipe 34a leads from the opening 4 to a drain 48a.

Between the connections of the pipes 26 and 32, the pipe 45 is provided with a rotary flowmeter 49 of the turbine type and in this example the meter is a "Leeds" meter. To enable the meter 49 to be disconnected from the pipe 45 for servicing whilst maintaining flow through the pipe 45, further stop valves 50 and 51 are provided immediately upstream and downstream of the meter 49 and there is a meter bypass pipe 52 provided with a stop valve 53.

The flowmeter 49, instead of being provided with a series of dials driven by its rotary shaft to register the total flow of water through it, is instead provided with a rotary cam 54 as shown in FIG. 4 of the drawings. The rotary cam 54 has a follower formed by an operating arm 55 of a two-way changeover microswitch 56. As shown in FIG. 4, the microswitch 56 is connected by a lead 57 to one pole of a double-pole isolating switch 58 and it is connected by further leads 59 and 60 to the two solenoid valves 33 and 35 respectively. The circuit of the valves 33 and 35 back to the switch 58 is completed by a common lead 61. Thus, when the switch 58 is connected through a current supply 62 and is closed, the valves 33 and 35 are alternately energized and deenergized as the cam 54 changes over the switch 56 upon rotation of the shaft of the meter 49. The cam 54 shown in FIG. 4 has a single lobe 63 which causes the switch 56 to be changed over once each way for each revolution of the shaft of the meter 49. Thus the meter 49 forms the control device which controls the operation of the solenoid valves 33 and 35 and the frequency of their operation is dependent upon the rate of flow of water through the pipe 45. As the flow increases, so the frequency of operation increases proportionately nd so does the volume of liquid fertilizer pumped form the tank 44 into the pipe 45. In this way the proportion of liquid fertilizer added to the water flowing through the pipe 45 is kept constant. The actual proportion can be varied by substituting a plug such as the plug 39a for the plug 39 and thus varying the stroke of the plunger assembly of the pump.

The proportion of liquid fertilizer added to the water can also be varied by substituting either a cam 54a shown in FIG. 5a or a cam 54b shown in FIG. 5b for the cam 54 shown in FIG. 4. The cam 54a has two lobes 63a and the cam 54b has four lobes 63b. Thus for any stroke of the pump, the cam 54a will cause it to make two stokes for every revolution of the shaft of the meter 49 to double the proportion of liquid fertilizer added to the water and similarly the cam 54b will double the proportion once again.

Instead of providing the two separate two port solenoid valves 33 and 35, a single three-port valve may be used. This valve is connected to the duct 30 and to both the pipes 32 and 34, the duct 31 being dispensed with. When the valve is energized the duct 30 communicates with the pipe 32 and when the valve is deenergized the duct 30 communicates with the pipe 34.

When the pump is used for delivering liquid fertilizer or other liquid which leaves a deposit on evaporation, there would be a tendency for the cup washer 17 to become gummed up when the pump is left idle for any length of time. This impairs the operation of the pump and rapidly damages the washer 17 to such an extent that the pump ceases to operate. This problem is overcome completely by the expedient of flushing out the cylinders 1 and 2 by water from the drainpipe 34. Any liquid passing the washer 17 is washed away and no drying out occurs in the space between the pistons 11 and 12.

I claim:

1. Liquid-proportionating apparatus for supplying a constant proportion of a liquid additive to a liquid flowing under pressure through a pipe, said apparatus comprising a fluid-pressure-operated pump including a casing defining first and second cylinders, said first cylinder being of smaller diameter than said second cylinder, a first piston in said first cylinder, a second piston in said second cylinder, means rigidly connecting said pistons to each other, spring means biasing said pistons to each other, spring means biasing said pistons in a direction towards said second cylinder, said first cylinder having an inlet and an outlet for said liquid additive, an inlet nonreturn valve and an outlet nonreturn valve in said inlet and said outlet respectively and said second cylinder having an inlet and an outlet, means connecting said pipe to said inlet to said second cylinder, a reservoir for said liquid additive, means connecting said reservoir to said inlet nonreturn valve of said first cylinder and means connecting said outlet nonreturn valve of said first cylinder to said pipe downstream of said means connecting said pipe to said inlet to said second cylinder, means for supplying said liquid to a space in said casing between said first and second pistons whereby said cylinders are washed and kept free of deposits from said liquid additive, and solenoid valves means for controlling the supply of said liquid from said pipe to said second cylinder and the exhaust thereof from said second cylinder, control means for said solenoid valve means, said control means including a rotary flowmeter in said pipe and means operatively connecting said flowmeter to said solenoid valve means whereby said flowmeter controls the frequency of operation of said solenoid valve means and hence the output of said pump in proportion to the rate of flow of said liquid under pressure through said pipe.

2. Apparatus as claimed in claim 1 further comprising a partition between said first and second cylinders, means defining an opening in said partition, said means interconnecting said pistons comprising a piston rod extending through said opening and said spring means comprising a coiled compression spring acting between said partition and said second piston.

3. Apparatus as claimed in claim 2, further comprising adjustable stop means in said first cylinder for adjusting the stroke of said interconnected pistons to vary the output of said pump.

4. Apparatus as claimed in claim 1, wherein said means operatively connecting said flowmeter to said solenoid valve means includes an electric circuit, a microswitch in said circuit, a rotary cam for opening and closing said microswitch and means operatively connecting said rotary cam to said flow meter for rotation thereby whereby said microswitch causes said solenoid valve means to be opened and closed in dependence upon the speed of rotation of said flowmeter.

5. Apparatus as claimed in claim 4, comprising means detachably connecting said rotary cam to said flowmeter and further comprising additional cams which are interchangeable for said cam to alter the relationship between the speed of rotation of said flowmeter and the frequency op operation of said solenoid valve means.

6. Apparatus as claimed in claim 1, in which said means for supplying said liquid comprises means connecting said outlet of said second cylinder to said space in said casing between said pistons and drain means leading from said space, whereby said liquid vented from said second cylinder flows through said first and second cylinders between said first and second pistons.

* * * * *